US007512629B2

(12) United States Patent
Haas et al.

(10) Patent No.: US 7,512,629 B2
(45) Date of Patent: Mar. 31, 2009

(54) CONSISTENT AND UNBIASED CARDINALITY ESTIMATION FOR COMPLEX QUERIES WITH CONJUNCTS OF PREDICATES

(75) Inventors: Peter Jay Haas, San Jose, CA (US); Marcel Kutsch, Cologne (DE); Volker Gerhard Markl, San Jose, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/457,418

(22) Filed: Jul. 13, 2006

(65) Prior Publication Data

US 2008/0016097 A1    Jan. 17, 2008

(51) Int. Cl.
*G06F 7/00*    (2006.01)
(52) U.S. Cl. ......................... 707/102; 707/100; 707/101
(58) Field of Classification Search ............... 707/1–10, 707/100–104.1
See application file for complete search history.

(56) References Cited

U.S. PATENT DOCUMENTS

| 5,469,568 | A | | 11/1995 | Schiefer et al. | |
|---|---|---|---|---|---|
| 5,542,073 | A | | 7/1996 | Schiefer et al. | |
| 5,864,841 | A | | 1/1999 | Agrawal et al. | |
| 6,108,648 | A | * | 8/2000 | Lakshmi et al. | 707/2 |
| 6,311,181 | B1 | * | 10/2001 | Lee et al. | 707/5 |
| 6,477,523 | B1 | | 11/2002 | Chiang | |
| 6,598,044 | B1 | * | 7/2003 | Waas et al. | 707/3 |
| 6,738,755 | B1 | | 5/2004 | Freytag et al. | |
| 6,763,359 | B2 | | 7/2004 | Lohman et al. | |
| 7,149,735 | B2 | * | 12/2006 | Chaudhuri et al. | 707/6 |
| 7,213,012 | B2 | * | 5/2007 | Jakobsson et al. | 707/2 |
| 2004/0210563 | A1 | * | 10/2004 | Zait et al. | 707/3 |
| 2004/0267713 | A1 | | 12/2004 | Chaudhuri et al. | |

OTHER PUBLICATIONS

Getoor et al., "Selectivity Estimation using Probabilistic Models", ACM Digital Library, 2001.
Despande et al., "Independence is Good: Dependency-Based Histogram Synopses for High-Dimensional Data", ACM Digital Library, 2001.
Yu Wang et al., "Estimating the selectivity of XML path", INSPEC AN-8229510, 2004.
Chung Warn Ill et al., "An efficient selectivity estimation method", Abstract, INSPEC AN-8328161, 2004.
Chauduri, S. et al., "Selectivity estimation for string predicates", INSPEC AN-8107407, 2004.

* cited by examiner

*Primary Examiner*—Mohammad Ali
*Assistant Examiner*—Huawen Peng
(74) *Attorney, Agent, or Firm*—Shimokaji & Associates, PC

(57) ABSTRACT

The present invention provides a method of selectivity estimation in which preprocessing steps improve the feasibility and efficiency of the estimation. The preprocessing steps are partitioning (to make iterative scaling estimation terminate in a reasonable time for even large sets of predicates), forced partitioning (to enable partitioning in case there are no "natural" partitions, by finding the subsets of predicates to create partitions that least impact the overall solution); inconsistency resolution (in order to ensure that there always is a correct and feasible solution), and implied zero elimination (to ensure convergence of the iterative scaling computation under all circumstances). All of these preprocessing steps make a maximum entropy method of selectivity estimation produce a correct cardinality model, for any kind of query with conjuncts of predicates. In addition, the preprocessing steps can also be used in conjunction with prior art methods for building a cardinality model.

14 Claims, 5 Drawing Sheets

| | |
|---|---|
| Input: | |
| A knowledge set $T \subset 2^N$ ($\emptyset \in T$) for the predicate index set $N$ and selectivities $\{s_Y: Y \in T\}$ | |
| Output: | |
| A partitioning of $N$ and $T$ into $N_1, ..., N_k$ and $T_1, ..., T_k$ such that $|N_i| \leq \mu$ for each $i$ | |
| 1 | $T := T \setminus \{\{1\}, \{2\}, ..., \{n\}\}$ |
| 2 | FOR $i := 1$ to $|N|$ |
| 3 | $N_i := \{i\}$ and $T_i := \{i\}$ |
| 4 | // ENDFOR $i$ |
| 5 | WHILE $T \neq \emptyset$ |
| 6 | Select $X \in T$ such that $\Delta_X \geq \Delta_Y$ for all $Y \in T \setminus X$ |
| 7 | $T := T \setminus X$ |
| 8 | IF $|\bigcup_{j \mid X \subseteq N_j} N_j| \leq \mu$ |
| 9 | FOR $i \in X$ |
| 10 | IF $i = \min(X)$ |
| 11 | $N_i := \bigcup_{j \mid X \subseteq N_j} N_j$ and $T_i := \bigcup_{j \mid X \subseteq N_j} T_j$ |
| 12 | ELSE |
| 13 | $N_i := \emptyset$ |
| 14 | //ENDIF |
| 15 | //ENDFOR $i$ |
| 16 | //ENDIF |
| 17 | //ENDWHILE |

Forced Partitioning

FIG.5

CONSISTENT AND UNBIASED CARDINALITY ESTIMATION FOR COMPLEX QUERIES WITH CONJUNCTS OF PREDICATES

BACKGROUND OF THE INVENTION

The present invention relates generally to the field of query plan optimization in relational databases and, more specifically, to preprocessing for efficiently optimizing query plans having conjunctive predicates.

When comparing alternative query execution plans (QEPs), a cost-based query optimizer in a relational database management system (RDBMS) needs to estimate the selectivity of conjunctive predicates. The optimizer immediately faces a problem of how to combine available partial information about selectivities in a consistent and comprehensive manner. Estimating the selectivity of predicates has always been a challenging task for a query optimizer in a relational database management system. A classic problem has been the lack of detailed information about the joint frequency distribution of attribute values in the table of interest. Perhaps ironically, the additional information now available to modern optimizers has in a certain sense made the selectivity-estimation problem even harder.

Specifically, consider the problem of estimating the selectivity $s_{1,2,\ldots,n}$ of a conjunctive predicate of the form $p_1 \wedge p_2 \wedge \ldots \wedge p_n$, where each $p_i$ is a simple predicate (also called a Boolean Factor, or BF) of the form "column op literal". Here "column" is a column name, "op" is a relational comparison operator such as "=", ">", or "LIKE", and "literal" is a literal in the domain of the column. Some examples of simple predicates are 'make="Honda"' and 'year >1984'. The selectivity of a predicate p, as known in the art, may be defined as the fraction (or, alternatively, the cardinality referring to the absolute number of satisfying rows) of rows in the table that satisfy p (where p is not restricted to conjunctive form). In typical prior art optimizers, statistics are maintained on each individual column, so that the individual selectivities $s_1, s_2, \ldots, s_n$ of $p_1, p_2, \ldots, p_n$ are available. Such a query optimizer would then impose an independence assumption and estimate the desired selectivity as $s_{1,2,\ldots,n} = s_1 * s_2 * \ldots * s_n$. This type of estimate ignores correlations between attribute values, and consequently can be inaccurate, often underestimating the true selectivity by orders of magnitude and leading to a poor choice of query execution plan (QEP).

To overcome the problems—such as inaccuracy resulting from ignoring correlations—caused by using the independence assumption, the optimizer can store the multidimensional joint frequency distribution for all of the columns in the database. However, in practice, the amount of storage required for the full distribution is exponentially large, making this approach infeasible. Alternative approaches therefore have been proposed for storage of selected multivariate statistics (MVS) that summarize important partial information about the joint distribution. Proposals have ranged from multidimensional histograms on selected columns to other, simpler forms of column-group statistics. Thus, for predicates $p_1, p_2, \ldots, p_n$, the optimizer typically has access to the individual selectivities $s_1, s_2, \ldots, s_n$ as well as a limited collection of joint selectivities, such as $s_{1,2}$, $s_{3,5}$, and $s_{2,3,4}$. The independence assumption is then used to "fill in the gaps" in the incomplete information, e.g., to estimate the unknown selectivity $s_{1,2,3}$ by $s_{1,2} * s_3$.

The problem, alluded to above, of combining available partial information about selectivities in a consistent and comprehensive manner now arises, however. There may be multiple, non-equivalent ways of estimating the selectivity for a given predicate. FIG. 1, for example, shows possible QEPs (a), (b), and (c) for a query consisting of the conjunctive predicate $p_1 \wedge p_2 \wedge p_3$. The QEP (a) in FIG. 1 uses an index-ANDing operation ($\wedge$) to apply $p_1 \wedge p_2$ and afterwards applies predicate $p_3$ by a FETCH operator, which retrieves rows from a base table according to the row identifiers returned from the index-ANDing operator. The optimizer may know the selectivities $s_1, s_2, s_3$ of the BFs $p_1, p_2, p_3$. It may also know about a correlation between $p_1$ and $p_2$ via knowledge of the selectivity $s_{1,2}$ of $p_1 \wedge p_2$. Using independence, the optimizer might then estimate the selectivity of $p_1 \wedge p_2 \wedge p_3$ as $s^a_{1,2,3} = s_{1,2} * s_3$.

FIG. 1 shows an alternative QEP (b) that first applies $p_1 \wedge p_3$ and then applies $p_2$. If the optimizer also knows the selectivity $s_{1,3}$ of $p_1 \wedge p_3$, use of the independence assumption might yield a selectivity estimate $s^b_{1,2,3} = s_{1,3} * s_2$. However, this would result in an inconsistency if, as is likely, $s^a_{1,2,3} \neq s^b_{1,2,3}$. There are potentially other choices, such as $s_1 * s_2 * s_3$ or, if $s_{2,3}$ is known, then $s_{1,2} * s_{2,3} / s_2$ (the latter estimate amounts to a conditional independence assumption). Any choice of estimate will be arbitrary, since there is no supporting knowledge to justify ignoring a correlation or assuming conditional independence. Such a choice will then arbitrarily bias the optimizer towards choosing one plan over the other. Even worse, if the optimizer does not use the same choice of estimate every time that it is required, then different plans will be estimated inconsistently, leading to "apples and oranges" comparisons and unreliable plan choices Assuming that the QEP (a) in FIG. 1 is the first to be evaluated, a prior art optimizer might avoid the foregoing problem that consistency might not be achieved by recording the fact that $s_{1,2}$ was applied and then avoiding future application of any other MVS that contain either $p_1$ or $p_2$, but not both. In the above example, the selectivities for the QEP (c) in FIG. 1 would be used and the ones for QEP (b) would not. The prior art optimizer would therefore compute the selectivity of $p_i \wedge p_3$ to be $s_1 * s_3$ using independence, instead of using the MVS $s_{1,3}$. Thus, the selectivity $s_{1,2,3}$ for QEP (c) would be estimated in a manner consistent with that of QEP (a). In the example illustrated by FIG. 1, when evaluating the QEP (a), the prior art optimizer used the estimate $s^a_{1,2,3} = s_{1,2} * s_3$ rather than $s_1 * s_2 * s_3$, because the former estimate better exploits the available correlation information, i.e., the correlation between $p_1$ and $p_2$. In general, there may be many possible choices for the estimate of $s^a_{1,2,3}$.

Although an ad hoc method as in the example of FIG. 1 may ensure consistency, it ignores valuable knowledge, e.g., the correlation between $p_1$ and $p_3$. Moreover, this method complicates the logic of the optimizer, because cumbersome bookkeeping is required to keep track of how an estimate was derived initially and to ensure that it will always be computed in the same way when estimating other plans. Even worse, ignoring the known correlation between $p_1$ and $p_3$ also introduces bias towards certain QEPs: if, as is often the case with correlation, $s_{1,3} >> s_1 * s_3$, and $s_{1,2} >> s_1 * s_2$, and if $s_{1,2}$ and $s_{1,3}$ have comparable values, then the optimizer will be biased towards the QEP (c) plan, even though the QEP (a) plan in FIG. 1 might be cheaper, i.e., the optimizer thinks that the QEP (c) will produce fewer rows during index-ANDing, but this might not actually be the case. In general, an optimizer will often be drawn towards those QEPs about which it knows the least, because use of the independence assumption makes these plans seem cheaper due to underestimation. This problem has been dubbed "fleeing from knowledge to ignorance".

Another significant problem encountered when estimating selectivities in a real-world database management system is that the given selectivities might not be mutually consistent.

For example, the selectivities $s_1=0.1$ and $s_{1,2}=0.15$ are inconsistent, because they violate the obvious requirement that $s_X \geq s_Y$ whenever $X \subseteq Y$. In the presence of inconsistent statistics, it may be impossible to find a set of satisfiable constraints for estimating all the selectivities in a consistent and comprehensive manner.

There are two typical causes of inconsistent statistics. First, the single-column statistics are often taken from the system catalogue directly or derived by the optimizer from catalogue statistics. Because collection of accurate statistics can be a highly cost-intensive process, commercial database systems typically compute catalogue statistics using approximate methods such as random sampling or probabilistic counting. Even when the catalogue statistics are exact, the selectivity estimates computed by the optimizer from these statistics often incorporate inaccurate uniformity assumptions or use rough histogram approximations based on a small number of known quantiles. A second cause of inconsistent knowledge is the fact that different statistics may be collected at different points in time, and the underlying data can change in between collection epochs. This problem is particularly acute in more recent prior art systems where some of the MVS used by the optimizer might be based on query feedback or materialized statistical views.

SUMMARY OF THE INVENTION

In one embodiment of the present invention, a computer-implemented method is given a set of input selectivities $\{s_X: X \in T\}$, and the method includes adjusting the input selectivities to obtain a mutually consistent set of selectivities; and minimizing the adjusting of the input selectivities.

In another embodiment of the present invention, a database query optimizer, receiving input of a knowledge set T for a predicate index set N and selectivities $\{s_Y: Y \in T\}$ for a predicate set P, executes steps for: selecting, in response to N not satisfying a partitioning condition, $X \in T$ such that X has the smallest impact on a maximum entropy (ME) solution to a constrained optimization problem; and removing the element X from T in order to force a partitioning of P and T.

In a further embodiment of the present invention, a computer program product comprising a computer useable medium includes a computer readable program, wherein the computer readable program when executed on a computer causes the computer to: input a set of input selectivities $\{s_X: X \in T\}$; form the $|T|$ constraints $\Sigma_{b \in C(X)} x_b = s_X$, $X \in T$; and detect a zero atom b for which $x_b = 0$ in the constraints.

These and other features, aspects and advantages of the present invention will become better understood with reference to the following drawings, description and claims.

BRIEF DESCRIPTION OF THE DRAWINGS

FIG. 5 is a pseudo-code algorithmic specification for forced partitioning for computation of selectivities according to an embodiment of the present invention.

DETAILED DESCRIPTION OF THE INVENTION

Figure 1:
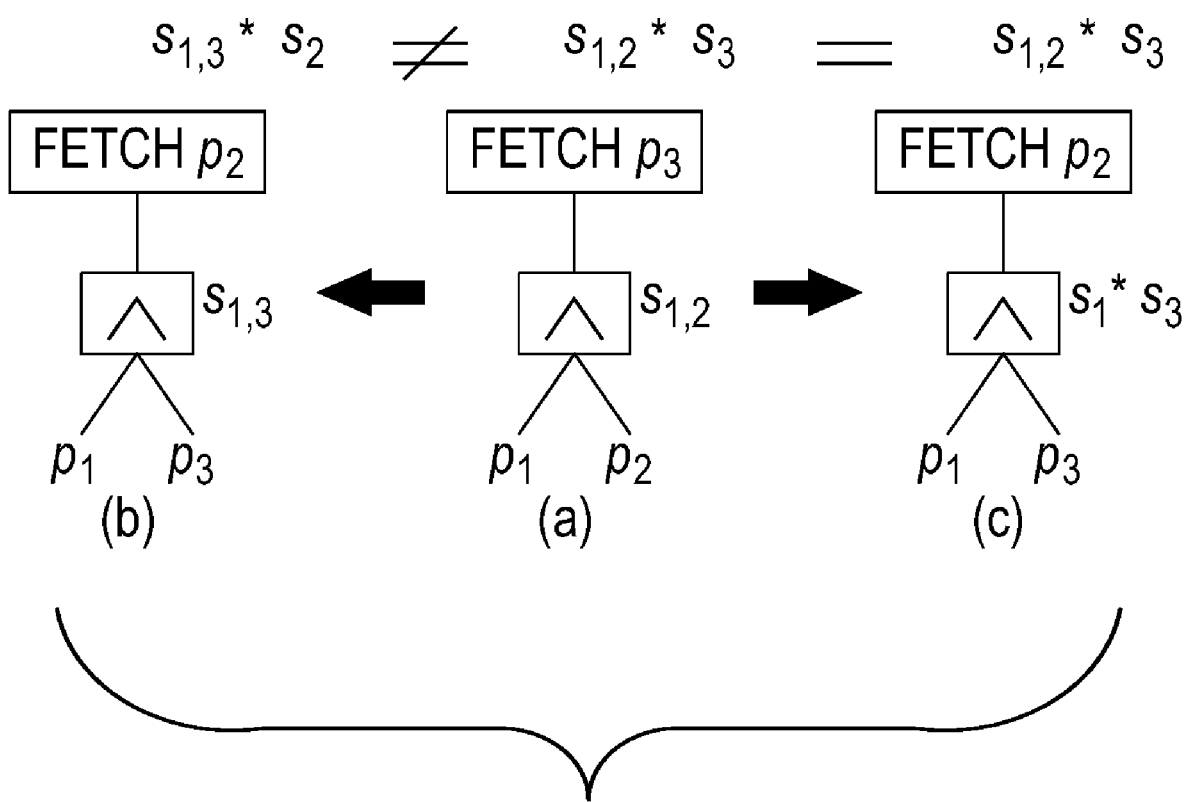
FIG. 1 illustrates exemplary QEPs (a), (b) and (c) and associated prior art selectivity estimates.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide a novel maximum entropy (ME) method for estimating the selectivity of conjunctive predicates, utilizing an approach that is information-theoretically sound, i.e., valid from the point of view of information theory, invented by Claude Shannon of MIT circa 1947, as known in the art, and that takes into account available statistics on both single columns and groups of columns. Embodiments of the invention find application, for example, in commercial query optimizers that use statistical information on the number of rows in a relational database management system table and the number of distinct values in a column to compute the selectivities of simple predicates.

Unlike prior art ad hoc query optimizers—such as the example given above—that select from available knowledge and thus remain subject to inconsistencies and to introducing biases, embodiments avoid arbitrary biases, inconsistencies, and the flight from knowledge to ignorance by deriving missing knowledge using the ME principle. Embodiments exploit any and all available multi-attribute information, in contrast to prior art selectivity models that typically ignore at least some available information.

Embodiments also differ from the prior art by introducing methods for resolving inconsistencies in the available multivariate statistics (MVS) that would otherwise prevent computation of a ME solution; such inconsistencies can arise when the single-column statistics in the catalogue have been computed only approximately, or when the various statistics used by the optimizer have been computed at different points in time.

Other embodiments differ from the prior art by including novel partitioning methods that permit application of the inventive method of selectivity estimation (and also prior art methods of selectivity estimation) to complex queries with many predicates. For example, in various embodiments, the efficiency of the ME computation can be improved—often by orders of magnitude—by partitioning the predicates into disjoint sets and computing an ME distribution for each of the resulting sub-problems. Thus, estimating selectivities for a complex query, e.g., one having more than 10 predicates, may be feasible with the present invention where not practical using prior art methods.

Further embodiments differ from the prior art by providing methods for detecting and eliminating atoms of the predicates with implied selectivity of zero (also referred to as "zero atoms" or "zeroes") prior to the computation of the selectivities of the predicates. Implied zero elimination may ensure convergence of an iterative scaling algorithm used in some embodiments to compute selectivies using the ME model. As with the novel methods for resolving inconsistencies and for partitioning, the novel method for implied zero elimination may also be applied to prior art methods for estimating selectivities.

The problem of selectivity estimation for conjunctive predicates, given partial MVS, may be formalized using the following terminology. A set of boolean factors (BFs) may be denoted as $P = \{p_1, \ldots, p_n\}$. For any $X \subseteq N = \{1, \ldots, n\}$, $p_X$ is used to denote the conjunctive predicate $\wedge_{i \in X} p_i$. The symbol s denotes a probability measure over $2^N$, the powerset of N, with the interpretation that $s_X$ is the selectivity of the predicate $p_X$. (The quantity $s_X$ can also be interpreted as the probability that a randomly selected row satisfies $p_X$.) Usually, for $|X|=1$, the histograms and column statistics from the system catalog determine $s_X$ and are all known. For $|X|>1$, the MVS may be stored in the database system catalog either as multidimensional histograms, index statistics, or some other form of column-group statistics or statistics on intermediate tables. In practice, $s_X$ is not known for all possible predicate combinations due to the exponential number of combinations of columns that can be used to define MVS. Suppose that $s_X$ is known for every X in some collection $T \subset 2^N$. The collection T may be referred to as the "knowledge set" for the predicates P. It may be defined that the empty set $\emptyset$ is always part of T, because $s_\emptyset = 1$ when applying no predicates. Given that $s_X$ is known for every X in the collection T, the selectivity estimation problem is to compute $s_X$ for $X \in 2^N \setminus T$, i.e., to compute $s_X$ for all the remaining sets X not in the collection T.

Information theory defines for a probability distribution $q = (q_1, q_2, \ldots)$ a measure of uncertainty called entropy:

$$H(q) = -\Sigma_i q_i \log q_i.$$

The ME principle prescribes selection of the unique probability distribution that maximizes the entropy function H(q) and is consistent with respect to the known information. Entropy maximization without any additional information uses the single constraint that the sum of all probabilities equals 1. The ME probability distribution is then the uniform distribution. When constraints only involve marginals of a multivariate distribution, the ME solution coincides with the independence assumption. Thus, query optimizers that do not use MVS comprise a special case of estimating their selectivities for conjunctive queries according to the ME principle: they assume uniformity when no information about column distributions is available, and they assume independence because they do not know about any correlations. In contrast, integrating the more general ME principle into the inventive optimizer's cardinality model, thereby generalizes these concepts of uniformity and independence. The ME principle enables the inventive optimizer to take advantage of all available information in a consistent way, avoiding inappropriate bias towards any given set of selectivity estimates. The ME principle applied to selectivity estimation means that, given several selectivities of simple predicates and conjuncts, the inventive optimizer chooses the most uniform and independent selectivity model consistent with this information.

Figure 2:
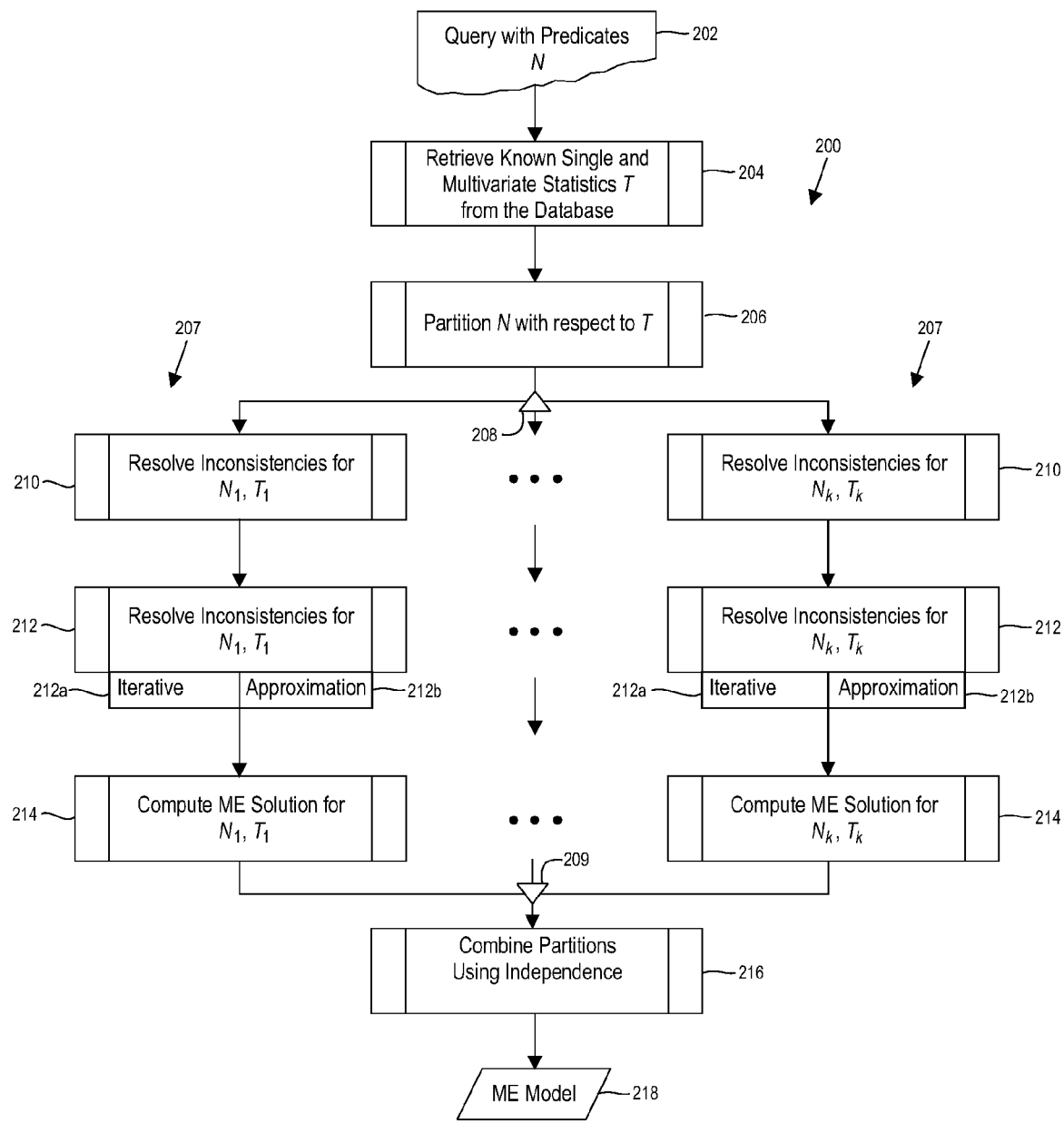
FIG. 2 is a block diagram for a method of preprocessing and estimating selectivities according to an embodiment of the present invention.

Referring now to FIG. 2, method 200 for estimating selectivities for a query may begin with an input 202 of a query with predicates indexed by the set N, for example, $P = \{p_1, \ldots, p_n\}$ and $N = \{1, \ldots, n\}$. N may be called the index set of P. A brief description of method 200 is given here, with more detailed descriptions of partitioning (206), resolving inconsistencies (210), and implied zero detection and elimination (212) steps of method 200 given further below.

At step 204, method 200 may retrieve single, e.g., individual selectivities $s_1, s_2, \ldots s_n$, and multivariate, e.g., joint selectivities, such as $s_{1,2}, s_{3,5}$, and $s_{2,3,4}$, statistics T from the database, where T is a collection $T \subset 2^N$, as formalized above.

At step 206, if there is a need to reduce computational complexity of estimating selectivities, the overall problem of estimating selectivities may be divided into several sub-problems 207 as indicated by the branching of flow arrows at 208. To accomplish a division of the overall problem into subproblems, method 200 may partition N with respect to T. The overall problem may then be solved by combining solutions for the sub-problems 207 as indicated by the rejoining of flow arrows at 209. If T satisfies a certain condition (described below), method 200 may accordingly partition N with respect to T ("naturally") at step 206 and, if not, method 200 may use forced partitioning to partition N with respect to T at step 206. Both types of partitioning, which may occur at step 206, are described in more detail below. Each of the sub-problems 207 corresponds to a component $N_k$ of the partition of N. (If N is not partitioned, there is only one component $N_1 = N$ and one sub-problem 207.)

At step 210, method 200 may resolve inconsistencies for each of the sub-problems 207 as described in more detail below.

At step 212, method 200 may detect and eliminate zero atoms as described in more detail below.

At step 214, method 200 may compute an ME solution of selectivity estimates for each component of the partition of N with respect to T.

At step 216, the solutions for the partitions may be combined, as described in more detail below in connection with partitioning.

At output 218, an overall solution for the problem of estimating selectivities may be given in accordance with the ME selectivity model.

In order to describe in more detail the partitioning (206), resolving inconsistencies (210), and implied zero detection and elimination (212) steps of method 200, the following begins with a description of the constrained optimization problem that may be solved at step 214 in order for method 200 to provide selectivity estimation at step 214. The constrained optimization problem is described first in order to provide a consistent terminology for describing the partitioning (206), resolving inconsistencies (210), and implied zero detection and elimination (212) steps.

Rather than applying the steps of resolving inconsistencies (210) and detecting zero atoms (212) directly to a selectivity estimation problem it may be more computationally efficient to first break up the selectivity estimation problem into smaller problems before applying the steps of resolving inconsistencies (210) and detecting zero atoms (212) individually to each smaller problem. Thus, method 200 may first perform the partitioning (206) process which accomplishes this breaking up of a problem into smaller sub-problems.

Likewise, because a newly consistent set of constraints may have new zero atoms, method 200 may first obtain a consistent starting set of constraints by applying the process of resolving inconsistencies (210) to the (sub)problem before detecting and removing zero atoms (212). Also, because the steps of resolving inconsistencies (210) and detecting zero atoms (212) may facilitate a more efficient computation of solutions to the constrained optimization (sub)problems for selectivity estimation, method 200 may first perform all the preprocessing steps of partitioning (206), resolving inconsistencies (210), and detecting zero atoms (212) before computing an ME solution for the constrained optimization problem. Thus, while the sections below are presented in a certain order to facilitate a logical and consistent exposition, that order of presentation of the processing steps of method 200 may be the reverse of the exemplary order of execution in method 200. Thus, each heading below is cross-referenced to a corresponding step of method 200.

The Constrained Optimization Problem (Step 214)

Given a set of predicates $P = \{p_1, p_2, \ldots, p_n\}$, each of the corresponding atoms—terms in disjunctive normal form (DNF), i.e., a term of the form $\wedge_{i \in N} p_i^{b_i}$ for $b_i \in \{0,1\}$—may be denoted in abbreviated form by a binary string of length n. For example, when $n = 3$, the string $b = 100$ denotes the atom $p_1 \wedge \neg p_2 \wedge \neg p_3$, and so forth. As above, $N=\{1,2,\ldots,n\}$ and $2^N$ is used to denote the set of all subsets of N. For each predicate $p^X$, $X \in 2^N$, $C(X)$ is used to denote the set of components of X, i.e., the set of all atoms contributing to $p_X$. Formally, $$C(X) = \{b \in \{0,1\}^n | b_i = 1 \text{ for all } i \in X\} \text{ and } C(\emptyset) = \{0,1\}^n.$$

For example, for predicates $p_1$ and $p_{1,2}$, the components are:

$$C(\{1\}) = \{100, 110, 101, 111\} \text{ and } C(\{1,2\}) = \{110, 111\}.$$

Additionally, for each possible knowledge set $T \subseteq 2^N$, $P(b, T)$ denotes the set of all $X \in T$ such that $p_X$ has b as an atom in its DNF representation, i.e., $$P(b,T) = \{X \in T | b_i = 1 \text{ for all } i \in X\} \cup \{\emptyset\}.$$

Thus, for the atom 011 and $T = 2^{\{1,2,3\}}$, for example, $P(b,T) = \{\{2\}, \{3\}, \{2,3\}, \emptyset\}$.

Given $s_X$ for $X \in T$, $s_X$ for $X \notin T$ may be computed according to the ME principle. To this end, method 200, for example, at step 214, may solve the following constrained optimization problem:

$$\underset{x_b | b \in \{0,1\}^n}{\text{minimize}} \sum_{b \in \{0,1\}^n} x_b \log x_b \quad \text{(Equation 1)}$$

subject to the $|T|$ constraints $$\sum_{b \in C(X)} x_b = s_X, \ X \in T, \quad \text{(Equation 2)}$$

where $x_b \in [0,1]$ denotes the selectivity of atom b. The $|T|$ constraints correspond to the known selectivities. One of the included constraints is $s_\emptyset = \sum_{b \in \{0,1\}^n} x_b = 1$, which asserts that the combined selectivity of all atoms is 1. The solution is a probability distribution with the maximum value of uncertainty (entropy), subject to the constraints. Given this solution, method 200 can compute any arbitrary selectivity $s_X$ as $s_X = \sum_{b \in C(X)} x_b$. The above problem can be solved analytically only in simple cases with a small number of unknowns. In general, a numerical solution method is required to solve the constrained optimization problem—such as an iterative scaling computation or a Newton-Raphson method.

EXAMPLE

Figure 3:
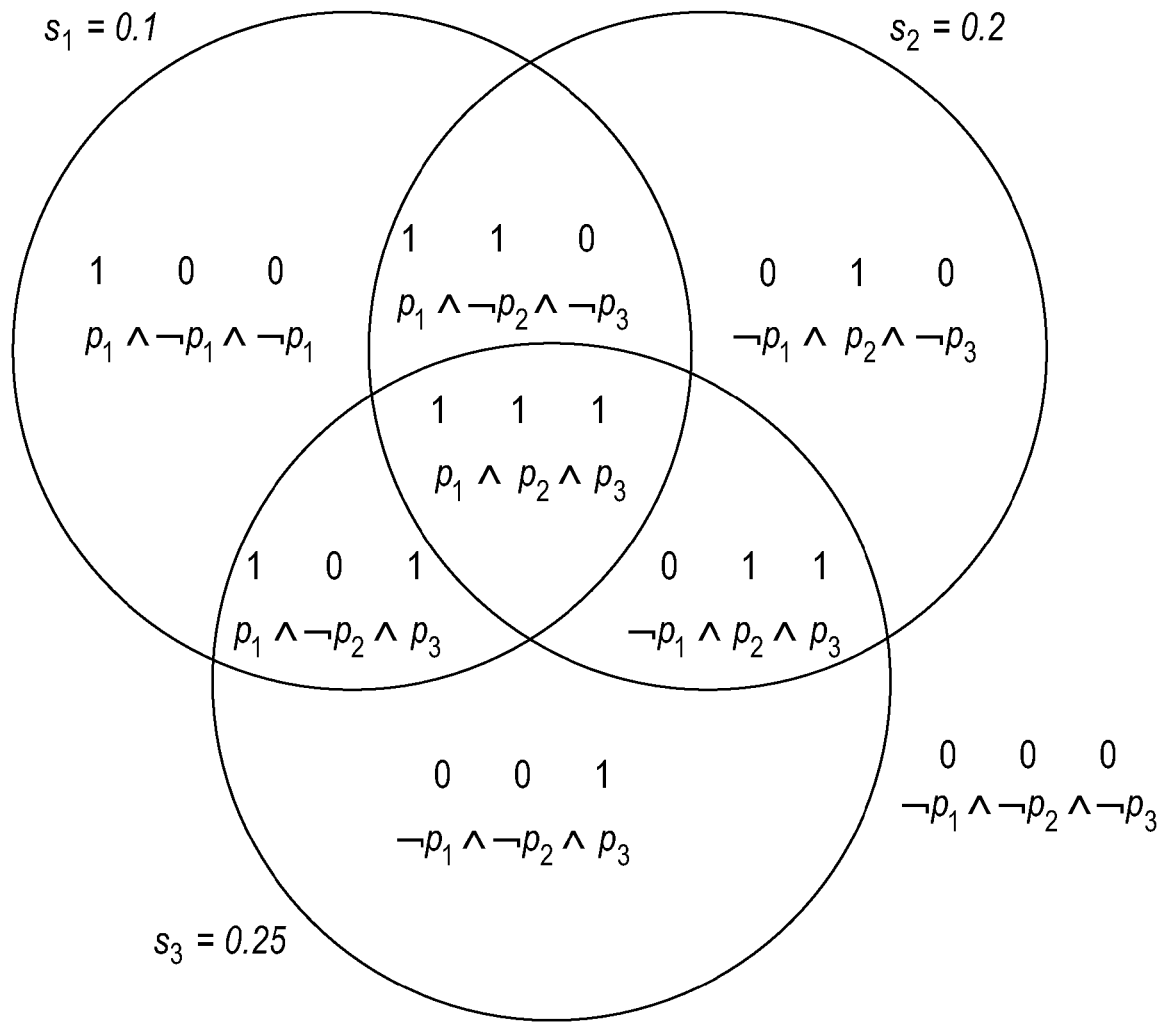
FIG. 3 is a Venn diagram illustrating an exemplary probability space given some known conjunctive predicate estimates according to an embodiment of the present invention.

FIG. 3 shows the probability space for the case $N=\{1,2,3\}$, $T=\{\{1\}, \{2\}, \{3\}, \{1,2\}, \{1,3\}, \emptyset\}$, and selectivities $s_1=0.1$, $s_2=0.2$, $s_3=0.25$, $s_{12}=0.05$, $s_{13}=0.03$, and $s_\emptyset=1$.

The example of FIG. 3 implies the following six constraints:

$$s_1 = x_{100} + x_{110} + x_{101} + x_{111} = 0.1 \quad \text{(I)}$$

$$s_2 = x_{010} + x_{011} + x_{110} + x_{111} = 0.2 \quad \text{(II)}$$

$$s_3 = x_{001} + x_{011} + x_{101} + x_{111} = 0.25 \quad \text{(III)}$$

$$s_{1,2} = x_{110} + x_{111} = 0.05 \quad \text{(IV)}$$

$$s_{1,3} = x_{101} + x_{111} = 0.03 \quad \text{(V)}$$

$$s_\emptyset = \sum_{b \in \{0,1\}^3} x_b = 1 \quad \text{(VI)}$$

The task of selectivity estimation is to now compute a solution for all atoms $x_b$, $b \in \{0,1\}^3$ that maximizes the entropy function $-\sum_{b \in \{0,1\}^3} x_b \log x_b$ and satisfies the above six constraints. Any desired selectivity $s_X$ can then be computed from the $x_b$ values as indicated previously.

Figure 4:
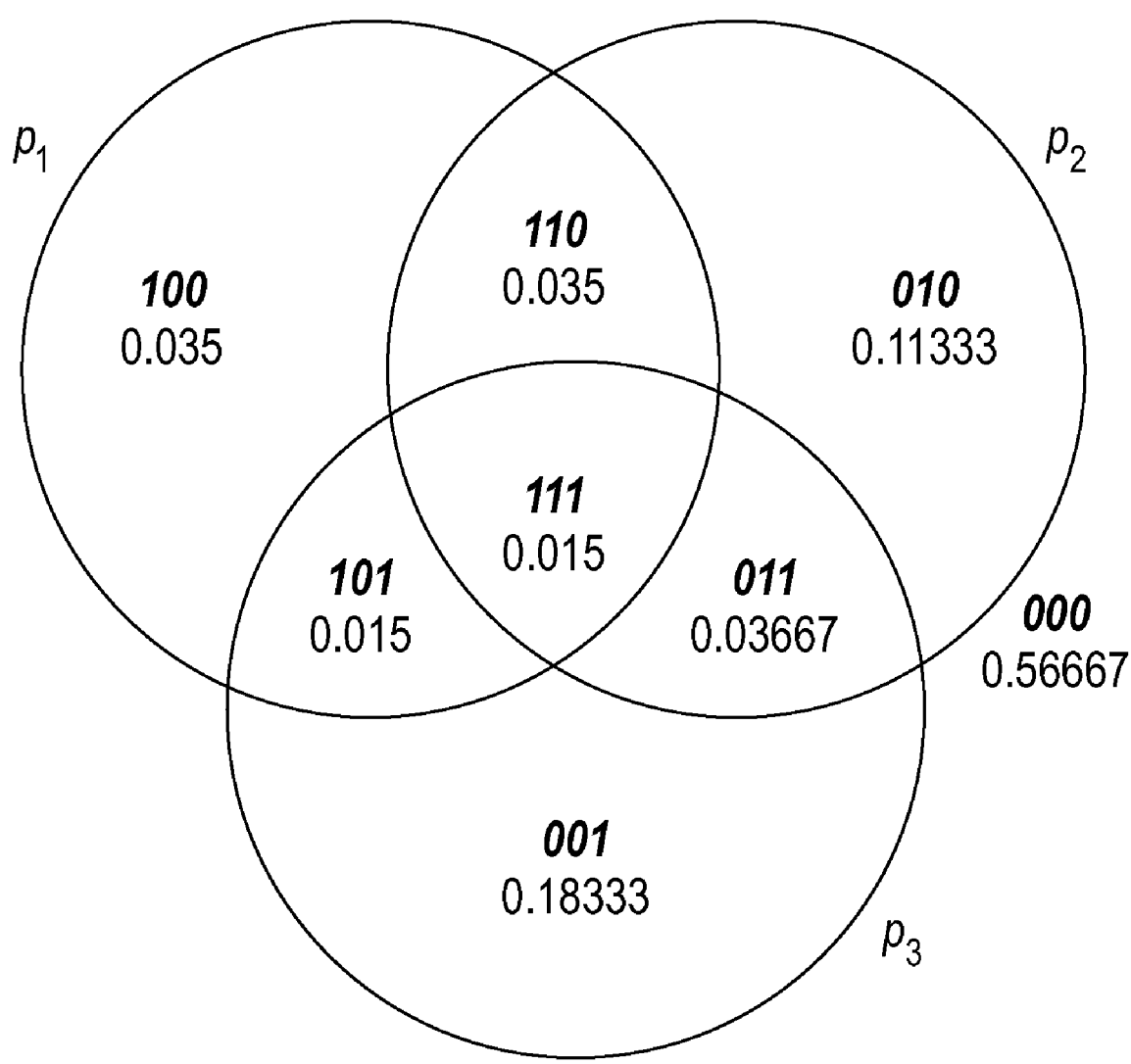
FIG. 4 is a Venn diagram illustrating a maximum entropy solution for the exemplary probability space shown in FIG. 3.

FIG. 4 gives the results obtained when solving this constrained optimization problem. For instance, in this ME solution, method 200 may obtain the selectivity estimate $s_{1,2,3} = x_{111} = 0.015$ and $s_{2,3} = x_{111} + x_{011} = 0.05167$.

Detection of Implied Zero Atoms (Step 212)

It is often the case that the constraints in Equation 2 imply that the selectivity of certain atoms must be zero in any feasible solution. For instance, if $p \Rightarrow p_2$, so that $s_1 = s_{1,2}$, then $x_{100} = x_{101} = 0$ in any solution x. These zero atoms, i.e., atoms for which the selectivity=0, can destabilize numerical solution algorithms so that they do not converge to a solution of the ME optimization problem. Consequently, all zero atoms must be identified and explicitly removed from the constraints in the ME optimization problem prior to execution of numerical solution algorithms.

Identifying zero atoms is nontrivial in general, because the reasoning involved can be arbitrarily complex. In the following sections, an iterative sub-method 212a and an approximation sub-method 212b are described for automatically detecting zero atoms, either of which may be used by method 200, for example, at step 212. The iterative sub-method 212a provides an exact solution but is computationally expensive while the approximation sub-method 212b is relatively quick (computationally inexpensive) but approximate.

Iterative Detection of Zero Atoms (Sub-method 212a)

The iterative sub-method 212a for detecting zero atoms is based on the following. If, for a given atom b, there exists a feasible solution x that satisfies all constraints in Equation 2 and in which $x_b > 0$, then $x_b$ is also positive in the ME solution.

The iterative sub-method 212a for zero detection may begin with an initial set $A_0$ of candidate zero atoms that contains all of the atoms: $A_0 = \{0,1\}^n$. In the first iteration the iterative sub-method 212a may set $i=0$ and solve the linear program (LP):

$$\underset{x_b | b \in \{0,1\}^n}{\text{maximize}} \sum_{b \in A_i} x_b \text{ subject to Equation 2 and to } x_b \in [0, 1], \quad \text{(Equation 3)}$$

$$b \in \{0, 1\}^n$$

using, e.g., the simplex method (as known in the art). The idea is that a solution to the above problem can make each $x_b$ as large as possible while satisfying the feasibility conditions. Any $x_b$ that is equal to 0 in the LP solution is therefore likely to be a zero atom. However, an $x_b$ that is equal to 0 in the LP solution is not guaranteed to be a zero atom; it could be the case that $x_b = 0$ in the computed optimal LP solution but not in other possible optimal LP solutions. The iterative sub-method 212a may therefore refine the set of candidates as $A_1 = A_0 \setminus \{b | x_b \neq 0\}$, set $i=1$, and solve the resulting LP in Equation 3. The iterative sub-method 212a may proceed in this manner, iterating until either (i) $A_i = \emptyset$ or (ii) $x_b = 0$ for every $b \in A_i$. In the former case, each candidate atom can have been shown to have positive probability in at least one feasible solution, and hence, as discussed previously, should be positive in the ME solution, and, therefore the iterative sub-method 212a may conclude that there are no zero atoms. In the latter case, the objective-function value for the solution to the LP in Equation 3 is 0, and therefore each atom $b \in A_i$ should have $x_b = 0$ in any feasible solution—otherwise, the optimal objective-function value would have been positive—and hence each atom b∈$A_i$ should have had $x_b$=0 also in the ME solution. Therefore, the iterative sub-method 212a may conclude that $A_i$ is precisely the set of zero atoms.

Example: Iterative Zero Detection (Sub-method 212a)

Suppose that N={1,2,3}, T={{1}, {2}, {3}, {1,2}, {1,3}, {2,3}, ∅}, $s_1$=0.23, $s_2$=0.01, $s_3$=0.015, $s_{1,2}$=0.01, $s_{1,3}$=0.01, $s_{2,3}$=0.01, and $s_\varnothing$=1. The constraints in the ME optimization problem are:

$$s_1 = x_{100} + x_{110} + x_{101} + x_{111} = 0.23$$

$$s_2 = x_{010} + x_{011} + x_{110} + x_{111} = 0.01$$

$$s_3 = x_{001} + x_{011} + x_{101} + x_{111} = 0.015$$

$$s_{1,2} = x_{110} + x_{111} = 0.01$$

$$s_{1,3} = x_{101} + x_{111} = 0.01$$

$$s_{2,3} = x_{011} + x_{111} = 0.01$$

$$s_\varnothing = \Sigma_{b \in \{0,1\}^3} x_b = 1$$

Setting $A_0$={0,1}$^3$ and solving the LP in Equation 3, the iterative sub-method 212a obtains a solution in which $x_{000}$, $x_{100}$, $x_{001}$, and $x_{111}$, are nonzero. For the next iteration the iterative sub-method 212a therefore sets $A_1$={010, 110, 101, 011}. Solving the resulting LP, the iterative sub-method 212a finds that $x_{010} = x_{110} = x_{101} = x_{011} = 0$, so that $A_2$ is the set of zero atoms.

The foregoing iterative sub-method 212a can be shown to discover every zero atom and not misclassify any nonzero atoms as zero atoms. Unfortunately, due to its iterative nature, the sub-method 212a may be so computationally expensive as to be impractical in real-world applications, even with a highly sophisticated LP solver.

Zero Detection Via Approximation (Sub-method 212B)

A more practical implementation of method 200 may employ an approximation detection sub-method 212b, for example, at step 212 of method 200, that may offer a reasonable trade-off between accuracy and execution time. The approximation detection sub-method 212b may first rewrite the selectivity of each atom as the sum of two new variables: $x_b = v_b + w_b$. The approximation detection sub-method 212b may now solve the following LP:

$$\text{maximize}_{v_b, w_b} \sum_{b \in \{0,1\}^n} v_b \text{ subject to}$$

$$\sum_{b \in C(X)} v_b + w_b = s_X,$$

$$X \in T$$

$$0 \leq w_b \leq 1 \text{ and } 0 \leq v_b \leq \varepsilon,$$

$$b \in \{0, 1\}^n$$

where ε is a small value. For example, ε=0.0001 may be selected, and the value chosen may depend on various factors such as execution time for solving the LP and the level of precision desired. After solving this LP, an atom b may be considered to be a zero atom if and only if $w_b = v_b = 0$. The idea is that setting $x_b = 0$ requires setting $v_b = 0$, which can significantly decrease the objective-function value because of the ε upper bound on all of the selectivities. Thus only "true" zero atoms are likely to be identified by the solution to the LP. The approximation detection sub-method 212b may include the $w_b$ variables because they provide the "padding" needed to ensure that the original constraints in Equation 2 are satisfied. The approximation detection sub-method 212b can find all of the zero atoms, but may be considered approximate in that it can mislabel some nonzero atoms as zero atoms. In practice, such mislabelings tend to be infrequent, so that the quality of the ultimate ME solution (e.g., given by method 200) remains good.

Example: Zero Detection Via Approximation (Sub-method 212B)

As in the previous example for sub-method 212a, again suppose that N={1,2,3}, T={{1}, {2}, {3}, {1,2}, {1,3}, {2,3}, ∅}, $s_1$=0.23, $s_2$=0.01, $s_3$=0.015, $s_{1,2}$=0.01, $s_{1,3}$=0.01, $s_{2,3}$=0.01, and $s_\varnothing$=1. The constraints in the resulting LP are:

$$s_1 = v_{100} + w_{100} + v_{110} + w_{110} + v_{101} + w_{101} + v_{111} + w_{111} = 0.23$$

$$s_2 = v_{010} + w_{010} + v_{011} + w_{011} + v_{110} + w_{110} + v_{111} + w_{111} = 0.01$$

$$s_3 = v_{001} + w_{001} + v_{011} + w_{011} + v_{101} + w_{101} + v_{111} + w_{111} = 0.015$$

$$s_{1,2} = v_{110} + w_{110} + v_{111} + w_{111} = 0.01$$

$$s_{1,3} = v_{101} + w_{101} + v_{111} + w_{111} = 0.01$$

$$s_{2,3} = v_{011} + w_{011} + v_{111} + w_{111} = 0.01$$

$$s_\varnothing = \Sigma_{b \in \{0,1\}^3} v_b + w_b = 1$$

In the solution returned by the simplex algorithm, the following variables are equal to zero: $v_{010}$, $w_{010}$, $v_{110}$, $w_{110}$, $v_{101}$, $w_{101}$, $v_{011}$, $w_{011}$. The approximation detection sub-method 212b therefore can take the set of zero atoms as {010, 110, 101, 011}. Observe that this solution for this example coincides with the solution for the previous example returned by the iterative detection sub-method 212a Resolving Inconsistencies (Step 210)

A significant problem encountered when applying ME selectivity estimation method 200 in a real-world database management system is that the given selectivities {$s_X$: X∈T} might not be mutually consistent. For example, the selectivities $s_1$=0.1 and $s_{1,2}$=0.15 are inconsistent, because they violate the obvious requirement that $s_X \geq s_Y$ whenever $X \subseteq Y$. In the presence of inconsistent statistics, there can not exist any solutions to the constrained optimization problem in Equations 1 and 2, much less an ME solution, and the iterative scaling algorithm, for example, if applied blindly, will fail to converge. Therefore, method 200 provides at step 210 a method for resolving inconsistencies that may adjust the input selectivities (obtained, e.g., at step 204) to obtain a set of satisfiable constraints, prior to solution of the constrained optimization problem, (e.g., at step 214) by execution, for example, of the iterative-scaling method.

The method for resolving inconsistencies first may associate two "slack" variables $a_X^+$; $a_X^-$ with each of the original constraints in Equation 2, except for the constraint corresponding to $s_\varnothing$. This latter constraint ensures that the atom selectivities sum to 1, and therefore may not be modified. The method for resolving inconsistencies (step 210) then may solve the following LP:

$$\text{minimize}_{a_X^+, a_X^-, x_b} \sum_{X \in T \setminus \varnothing} a_X^+ + a_X^- \text{ subject to} \quad \text{(Equation 4)}$$

-continued $$\sum_{b \in C(X)} x_b + a_X^+ - a_X^- = s_X,$$

$$X \in T \setminus \{\emptyset\},$$

$$\sum_{b \in \{0,1\}^n} x_b = 1$$

$$a_X^+ \geq 0, a_X^- \geq 0 \text{ and } 0 \leq s_X - a_X^+ + a_X^- \leq 1$$

The slack variables may represent either positive or negative adjustments to the selectivities needed to ensure the existence of a feasible solution. In this connection, it may be observed that, in the optimal solution to the LP, at most one of the two slack variables for a constraint can be nonzero; indeed, for a specified value $a_X^+ - a_X^-$ of the total adjustment, any solution that has a nonzero value for both slack variables yields a higher value of the objective function than a solution with only a single nonzero slack variable. The presence of a nonzero slack variable can both signal the presence of an inconsistency and indicate how to obtain consistency, namely, by setting $s_X^* := s_X - a_X^+ + a_X^-$. The constraint in Equation 4 ensures that the adjusted selectivities lie in the range [0,1] By taking the objective function as the sum of the slack variables, the method for resolving inconsistencies (step 210) can ensure that the adjustments to the constraints are as small as possible.

In an alternative embodiment of step 210, the terms in the objective function may be weighted to reflect the fact that, typically, some statistics are more reliable than others. A large weighting coefficient for the slack variables $a_X^+$ and $a_X^-$ could be used for a corresponding selectivity $s_X$ that is relatively more reliable; thus, this selectivity is relatively unlikely to be adjusted because an adjustment would incur a relatively large penalty in the objective function. By means of this weighting method, unreliable statistics are more likely to be subject to adjustments than reliable ones.

A newly consistent set of constraints may have zero atoms. Method 200, thus, first may obtain a consistent starting set of constraints at step 210 using the methods described here and then detect and remove zero atoms at step 212 as described above under the headings relating to "ZERO DETECTION".

Example: Inconsistency Detection and Removal (Step 210)

Suppose that $N=\{1,2\}$, $T=\{\{1\}, \{2\}, \{1,2\}, \emptyset\}$, $s_1=0.99$, $s_2=0.99$, $s_{1,2}=0.90$, and $s_\emptyset=1$. The constraints for the LP are given by:

$$s_1 = x_{10} + x_{11} + a_1^+ - a_1^- = 0.99$$

$$s_2 = x_{01} + x_{11} + a_2^+ - a_2^- = 0.99$$

$$s_{1,2} = x_{11} + a_{1,2}^+ - a_{1,2}^- = 0.90$$

$$s_\emptyset = x_{00} + x_{10} + x_{01} + x_{11} = 1$$

Minimizing the sum over all slack variables yields the following solution:

$$a_1^+ = a_1^- = 0$$

$$a_2^+ = a_2^- = 0$$

$$a_{1,2}^+ = 0$$

$$a_{1,2}^- = 0.08$$

Although it may not be readily apparent, the constraint set T contains an inconsistency, because $a_{1,2}^- = 0.08$. Applying the resulting adjustment, the method for resolving inconsistencies (step 210) may obtain the set of consistent selectivities $s_1^* = 0.99$, $s_2^* = 0.99$, and $s_{1,2}^* = 0.98$.

Partitioning (Step 206)

Because solving the constrained optimization problem (e.g., at step 214), for example, using iterative scaling, has computational complexity that is exponential on the size of the predicate set P, e.g., complexity of $O(|T|2^{|P|})$, it may be desirable to avoid executing the iterative scaling algorithm on the full predicate set P. Instead, method 200 may compute the ME solution by partitioning P into several disjoint subsets, executing the iterative scaling computation on each subset independently, and using the independence assumption to combine selectivity estimates for predicates in different partitions. Partitioning can reduce the computational complexity from $O(|T|2^{|P|})$ to $O(|T_1|2^{|P_1|} + |T_2|2^{|P_2|} + \ldots + |T_k|2^{|P_k|})$, where $T_1, T_2, \ldots, T_k$ and $P_1, P_2, \ldots, P_k$ form a partition of the predicate set P and can make the iterative scaling algorithm feasible even for extremely complex queries with large sets of predicates.

Method 200 can naturally partition the predicate set P under certain conditions, e.g. the partitioning condition described below; otherwise, method 200 may force a partition of the predicate set P or may force a further partition of the natural partition if there is a need to make the partition sizes smaller.

If, at step 206, method 200 can split $N=\{1,2,\ldots,n\}$ into nonempty disjoint subsets $N_1, N_2, \ldots, N_k$, such that for each $X \in T$ it is the case that $x \subseteq N_i$ for some $i \in \{1,2,\ldots,k\}$, then the index set N of P is said to satisfy a partitioning condition. In that case, method 200 may partition P and T accordingly (or naturally partition P and T) by setting $$P_i = \{p_j | j \in N_i\} \text{ and } T_i = \{X \in T | X \subseteq N_i\}$$

for $1 \leq i \leq k$. (It may be observed that the $T_i$ sets are not completely disjoint, because they all contain $\emptyset$.) In method 200, the ME solution for (P,T) can be obtained by first (e.g., using iterative scaling) computing the ME solutions for $(P_1, T_1)$, $(P_2, T_2), \ldots, (P_k, T_k)$ and then using the independence assumption to combine selectivity estimates for predicates in different partitions; i.e., method 200 may compute $$s_X = \Pi_{i \in \{1,2,\ldots,k\}} s_{X \cap N^j}$$

for $X \in 2^N$.

For example, when $N=\{1,2,3,4\}$ and $T=\{\{1\}, \{1,2\}, \{3\}, \{3,4\}, \emptyset\}$, method 200 can take $N_1=\{1,2\}$, $N_2=\{3,4\}$, $T_1=\{\{1\}, \{1,2\}, \emptyset\}$, and $T_2=\{\{3\}, \{3,4\}, \emptyset\}$ Method 200 can then, for example, compute $s_2$ by obtaining the ME solution for $(P_1, T_1)$, compute $s_4$ by obtaining the ME solution for $(P_2, T_2)$, and then compute $s_{2,4}$ using the independence assumption as $s_{2,4} = s_2 * s_4$.

Partitioning can reduce the iterative scaling computation complexity from $O(|T|2^{|N|})$ to $O(T_1 2^{|N_1|} + \ldots + T_k 2^{|N_k|})$, making iterative scaling feasible even for large sets of predicates N. For example, when $N=\{1,2,\ldots,12\}$, $|T|=25$, $k=4$, $|N_i|=3$ and $|T_i|=7$, the use of partitioning can reduce the complexity by two orders of magnitude.

In practice, partitioning can reduce the computational complexity even more than is indicated above, by avoiding execution of the iterative scaling computation altogether for specified partitions $(P_i, T_i)$. In the above example, for instance, method 200 can compute the selectivity $s_{1,2,4}$ as $s_{1,2,4} = s_{1,2} * s_4$; because $s_{1,2}$ is known a priori, method 200 need only run iterative scaling on $(P_2, T_2)$ and not on $(P_1, T_1)$. Similarly, if a partition contains only a few predicates, it may be possible to compute the desired ME selectivity analytically, without requiring iterative scaling. For example, suppose that $P_i=\{p_1, p_2, p_3\}$, $T_i=\{\{1\}, \{2\}, \{3\}, \{1,2\}, \{2,3\}, \emptyset\}$, and method 200 needs to compute $s_{1,2,3}$. It can be shown, for this example, that $s_{1,2,3}=s_{1,2}*s_{2,3}/s_2$, so that no iterative scaling computation is needed. In general, it may be possible to maintain a "library" of such identities, and method 200 may perform a quick syntactic analysis at selectivity-estimation time to see if any of the identities apply.

Forced Partitioning (step 206)

In order to provide adequate real-time performance for computation of the constrained optimization problem (e.g., at step 214) using iterative scaling, for example, it may be desirable to ensure that each partition $N_i$ of N, as described above, has a cardinality smaller than $\mu$, where $\mu$ is a constant natural number greater than or equal to one that depends on the computer hardware and system load. For example, the constant $\mu$ may depend primarily on the CPU speed of the computer. On a single-user laptop using an Intel Pentium® III Mobile CPU 1133 MHz with 512 MB RAM, for example, a value for $\mu=8$ has been found to provide computation time typically less than one second for iterative scaling computations.

It may not always be possible to partition N into subsets of cardinality less than $\mu$ for a given set T. For instance, if $N=\{1,2,3,4,5,6\}$ and $T=\{\{1\}, \{2\}, \{3\}, \{4\}, \{5\}, \{6\}, \{1,2\}, \{2,3\}, \{3,4\}, \{4,5\}, \{5,6\}\}$, then N cannot be partitioned for $\mu=3$ because for any partitioning of N into $N_1$ and $N_2$, there exists at least one $X \in T$ such that $X \cap N_1 \neq \emptyset$ and $X \cap N_2 \neq \emptyset$. Thus, the independence assumption applied between any two partitions $N_1$ and $N_2$ in this example cannot result in the correct ME solution for N and T.

In such cases, method 200 may remove elements from T in order to force a partitioning in which $|N_i| \leq \mu$. However, this forced partitioning can impact the quality of the ME solution, since method 200 is discarding information. Ideally, a forced-partitioning method should remove those elements that have the least impact on the ME solution. Such a method, however, would be very computationally expensive, because it would have to consider the interaction of every constraint with every other constraint. Method 200 may use a pragmatic computational method (e.g., at step 206) for forced partitioning with complexity $O(|T|\log|T|)$ that ignores interactions and greedily removes elements from T with the goal of minimizing the impact on the ME solution, described as follows.

When generating partitions, method 200 may keep track of the cardinality $c_i$ of each partition $N_i$. At the beginning, method 200 may start with $|N|$ partitions, $N_i=\{i\}$ and $c_i=1$ for every partition. Method 200 then may iteratively merge partitions based on each element $X \in T$, i. e, $$N_i = \begin{cases} \bigcup_{j | X \subseteq N_j} N_j & \text{if } i = \min(X); \\ \emptyset & \text{otherwise,} \end{cases}$$

which reduces the number of partitions, but increases $c_i$. Method 200 may only add an element $X \in T$ to the knowledge set $T_i$ of partition $N_i$ if afterwards $c_i \leq \mu$ is still satisfied. If $c_i \leq \mu$ is violated, method 200 may ignore X.

In order to have as little impact as possible on the overall ME solution, method 200 may avoid discarding those elements $X \in T$ that correspond to knowledge about the largest deviations from independence. Method 200 can achieve this goal by processing elements in descending order of $\Delta_X$, where $\Delta_X = s_X / \Pi_{i \in X} s_i$. The quantity $\Delta_X$ measures the degree to which the corresponding $s_X$ constraint in Equation 2 forces the ME solution away from independence. FIG. 5 summarizes the computation for forced partitioning. An efficient implementation could store T as a list sorted according to $\Delta_X$ and thus have a complexity of $O(|T|\log|T|)$.

Example: Forced Partitioning (Step 206)

Let $N=\{1,2,3,4,5,6\}$ and $T=\{\{1\}, \{2\}, \{3\}, \{4\}, \{5\}, \{6\}, \{1,2\}, \{2,3\}, \{3,4\}, \{4,5\}, \{5,6\}\}$. Also suppose that $$s_1=0.1, s_2=0.2, s_3=0.3, s_4=0.4, s_5=0.5, s_6=0.6$$

and $$s_{1,2}=0.1, s_{2,3}=0.2, s_{3,4}=0.3, s_{4,5}=0.4, s_{5,6}=0.5.$$

It follows that $\Delta_{1,2}=5$, $\Delta_{2,3}=3.33$, $\Delta_{3,4}=2.5$, $\Delta_{4,5}=2$, and $\Delta_{5,6}=1.67$. With $\mu=3$, the forced partitioning method (step 206) therefore obtains $k=2$, $N_1=\{1,2,3\}$, $T_1=\{\{1\}, \{2\}, \{3\}, \{1,2\}, \{2,3\}\}$, $N_2=\{4,5,6\}$, and $T_2=\{\{4\}, \{5\}, \{6\}, \{4,5\}, \{5,6\}\}$. The element $\{3,4\}$ has been dropped, to enable the partitioning of N into $N_1$ and $N_2$. Of all the elements that prevent partitions of size 3 from being constructed, the element $\{3,4\}$ may have the smallest impact on the ME solution.

It should be understood, of course, that the foregoing relates to exemplary embodiments of the invention and that modifications may be made without departing from the spirit and scope of the invention as set forth in the following claims.

We claim:

1. A computer-implemented method for a database, given a set of input selectivities $\{Sx: X \in T\}$, wherein T represents a knowledge set, the method comprising: partitioning a predicate index set N with respect to said input selectivities, wherein a number of said partitions is at least one, wherein the input selectivities can be single or multivariate; and wherein a constant $\mu$: is chosen such that the cardinality of each partition $N_1, N_2, \ldots, N_k$ follows $|N_i| \leq \mu$ for each $i \in \{1,2,\ldots, k\}$;

adjusting said input selectivities to obtain a mutually consistent set of selectivities, wherein each partition set of selectivities is adjusted separately and treated as a separate unit; wherein said adjusting step comprises associating two slack variables with each constraint of said constrained optimization problem, except for the constraint corresponding to an $S_\phi$ minimizing said adjusting of said input selectivities; wherein said minimizing step comprises minimizing a total sum of said slack variables; and combining the selectivity estimates in the separate partitions using an independence assumption, $$S_x = \Pi_{i \in \{1,2,\ldots,k\}} S_{x \cap N_i} \text{ for } X \in 2^n;$$

wherein said given set of input selectivities is not mutually consistent; and said adjusted selectivities are mutually consistent and yield a set of satisfiable constrained optimization problem.

2. The method of claim 1, wherein said constrained optimization problem is a maximum entropy (ME) constrained optimization problem for estimating selectivities of conjunctive predicates.

3. The method of claim 1, further comprising:

weighting a first pair of slack variables with a first weighting coefficient, said first pair of slack variables associated with a constraint for a selectivity $s_x$;

weighting a second pair of slack variables with a second weighting coefficient, said second pair of slack variables associated with a constraint for a selectivity $s_y$, wherein:

selectivity $s_x$ is more reliable than selectivity $s_y$, and said first weighting coefficient is larger than said second weighting coefficient; and performing said adjusting and minimizing steps with said weighting coefficients.

4. The method of claim 3, wherein:

said minimizing step comprises solving a linear program (LP) having slack variables $a_x^+$; $a_x^-$, said LP including:

$$\operatorname*{minimize}_{a_X^+, a_X^-, x_b} \sum_{X \in T \setminus \emptyset} a_X^+ + a_X^- \text{ subject to}$$

$$\sum_{b \in C(X)} x_b + a_X^+ - a_X^- = s_X,$$

$$X \in T \setminus \{\emptyset\},$$

$$\sum_{b \in \{0,1\}^n} x_b = 1$$

$$a_X^+ \geq 0, a_X^- \geq 0 \text{ and } 0 \leq s_X - a_X^+ + a_X^- \leq 1; \text{ and}$$

said adjusting step includes replacing each $s_x$ with $s_x - a_x^+ - a_x^-$.

5. A database query optimizer, wherein the optimizer is embodied in a software program for database management and executed by a processor, the optimizer receiving input of a knowledge set T for a predicate index set N and selectivities $\{S_y : Y \in T\}$ for predicate set P, the optimizer executing steps for:

partitioning said predicate index set N with respect to said input selectivities; wherein a constant μ: is chosen such that the cardinality of each partition $N_1, N_2, \ldots, N_k$ follows $|N_i| \leq \mu$ for each $i \in \{1, 2, \ldots, k\}$;

selecting, in response to said predicate index set$_{13}$ N not satisfying a partitioning condition, X∈T such that X has the smallest impact on a maximum entropy (ME) solution to a constrained optimization problem removing the element X from T in order to force a partitioning of P and T;

partitioning P and T accordingly in response to said predicate index set N satisfying a partitioning condition.

6. The optimizer of claim 5, further comprising executing steps for:

choosing a constant μ:; and removing elements from T in order to force a partitioning of P and T with partitions $N_1, N_2, \ldots, N_k$ in which $|N_i| \leq \mu$ for each $i \in \{1, 2, \ldots, k\}$.

7. The optimizer of claim 5, wherein said selecting X∈T further comprises selecting X in descending order of $\Delta_x$, where $\Delta_x = s_{x|\Pi i \in x} s_i$.

8. The optimizer of claim 5, wherein said forcing a partition further comprises:

starting with |N| partitions, wherein $N_i = \{i\}$ and $c_i = 1$ for every partition;

iteratively merging partitions based on each element X∈T, so that $$N_i = \begin{cases} \bigcup_{j | X \subseteq N_j} N_j & \text{if } i = \min(X); \\ \emptyset & \text{otherwise,} \end{cases}$$

adding an element X∈T to the knowledge set $T_i$ of partition $N_i$ only if afterwards $c_i \leq \mu$ is still satisfied and otherwise, if $C_i \leq \mu$ is violated, ignoring X 9. The optimizer of claim 5 wherein:

said satisfied partitioning condition is that $N = \{1, 2, \ldots, n\}$ can be split into nonempty disjoint subsets $N_1, N_2, \ldots, N_k$, such that for each X∈T it is the case that $X \subseteq N_i$ for some $i \in \{1, 2, \ldots, k\}$; and said partitioning P and T accordingly comprises setting $P_i = \{p_j | j \in N_i\}$ and $T_i = \{X \in T | X \subseteq N_i\}$ for $1 \leq i \leq k$.

10. A computer program product comprising a computer useable medium including a computer readable program to be loaded into a computer system with a processor, wherein the computer readable program when executed by the processor causes the computer to:

input a set of input selectivities $\{s_x : X \in T\}$;

partition a predicate index set N with respect to said input selectivities, wherein a number of said Dartitions is at least one, wherein the input selectivities can be single or multivariate; and wherein a constant μ: is chosen such that the cardinality of each partition $N_1, N_2, \ldots, N_k$ follows $|N_i| \leq \mu$ for each $i \in \{1, 2, \ldots, k\}$;

form the |T| constraints $\Sigma_{b \in C(X)} x_b = s_x$, X∈T; wherein each partition set of selectivities is constrained separately and treated as a separate unit;

detect a zero atom b for which $x_b = 0$ in said constraints; and combining the zero atoms determined in the separate partitions using an independence assumption.

11. The computer program product of claim 10, wherein said step of detecting further comprises:

detecting said zero atom using an iterative process.

12. The computer program product of claim 10, wherein said step of detecting further comprises:

detecting said zero atom using an approximation process.

13. The computer program product of claim 10, wherein said step of detecting further comprises:

setting an initial set $A_0$ of candidate zero atoms to contain all of the atoms so that $A_0 = \{0, 1\}^n$;

in a first iteration, setting $i=0$ and solving the linear program (LP):

$$\operatorname*{maximize}_{x_b | b \in \{0,1\}^n} \sum_{b \in A_i} x_b \text{ subject to the } |T| \text{ constraints} \quad \text{(Equation 1)}$$

$$\sum_{b \in C(X)} x_b = s_X,$$

$$X \in T,$$

and to $x_b \in [0, 1], b \in \{0, 1\}^n$;

in a second iteration, refining the set of candidates as $A_1 = A_0 \setminus \{b | x_b \neq 0\}$, setting $i=1$, and solving the resulting LP in Equation 1; and further iterating until either (i) $A_i = \emptyset$ or (ii) $x_b = 0$ for every $b \in A_i$.

14. The computer program product of claim 10, wherein said step of detecting further comprises:

rewriting the selectivity $x_b$ of each atom as the sum of two new variables: $x_b = V_b + W_b$;

solving the following LP:

$$\operatorname*{maximize}_{v_b, w_b} \sum_{b \in \{0,1\}^n} v_b \text{ subject to the } |T| \text{ constraints}$$

$$\sum_{b \in C(X)} v_b + w_b = s_X,$$

$$X \in T,$$

and to $0 \leq w_b \leq 1$ and $0 \leq v_b \leq \varepsilon, b \in \{0, 1\}^n$;

wherein ε is a chosen small value in [0, 1]; and detecting an atom b as a zero atom if and only if $W_b = V_b = 0$.

* * * * *